(12) United States Patent
Liu et al.

(10) Patent No.: US 8,232,097 B2
(45) Date of Patent: *Jul. 31, 2012

(54) THERMAL CYCLER

(75) Inventors: Peng Liu, Beijing (CN); Li Fan, Beijing (CN); Li Qian, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 175 days.

This patent is subject to a terminal disclaimer.

(21) Appl. No.: 12/702,247

(22) Filed: Feb. 8, 2010

(65) Prior Publication Data

US 2011/0071681 A1    Mar. 24, 2011

(30) Foreign Application Priority Data

Sep. 23, 2009    (CN) .......................... 2009 1 0190734

(51) Int. Cl.
*C12M 1/00* (2006.01)
*C12M 3/00* (2006.01)

(52) U.S. Cl. ..................... 435/303.1; 219/520; 219/546; 219/553; 435/287.2; 977/742

(58) Field of Classification Search ............... 435/286.5, 435/287.1–287.3, 303.1, 287.2; 219/520, 219/546, 553
See application file for complete search history.

(56) References Cited

U.S. PATENT DOCUMENTS

| 6,556,940 | B1 * | 4/2003 | Tretiakov et al. ............. 702/130 |
| 2007/0261421 | A1 * | 11/2007 | Pierson ............................ 62/175 |
| 2009/0226903 | A1 * | 9/2009 | Cobb ................................. 435/6 |

FOREIGN PATENT DOCUMENTS

EP    2043406    * 1/2009

* cited by examiner

*Primary Examiner* — Michael Marcheschi
*Assistant Examiner* — Shanta G Doe
(74) *Attorney, Agent, or Firm* — Altis Law Group, Inc.

(57) ABSTRACT

A thermal cycler includes a bearing element, a heating element, a first cooling element, and a temperature controller. The bearing element carries at least one reaction mixture. The heating element raises the temperature of the reaction mixture. The heating element includes a housing, at least one carbon nanotube structure and a pair of electrodes. The carbon nanotube structure and the pair of electrodes are accommodated in the housing. The pair of electrodes is electrically connected to the carbon nanotube structure. The first cooling element cools the temperature of the reaction mixture. The temperature controller is electrically connected to the heating element and the first cooling element. The temperature controller controls the operation of the heating element and the first cooling element.

18 Claims, 12 Drawing Sheets

THERMAL CYCLER

BACKGROUND

1. Technical Field

The present disclosure relates to thermal cyclers, and particularly to a thermal cycler based on carbon nanotubes.

2. Description of Related Art

The polymerase chain reaction (PCR) is a technique broadly utilized in the field of biology and, in particular, for genetic research and medical diagnosis. PCR is based on thermal cycling, consisting of cycles of repeated heating and cooling of reaction samples to amplify a single or a few copies of nucleotide fragments to generate thousands to millions of copies of a particular sequence within the nucleotide fragment.

Generally, PCR is carried out by a thermal cycler also known as a thermocycler, which alternatively heats and cools the reaction sample to a defined series of temperature steps. The reaction sample commonly includes nucleotide fragments, a pair of primers, a polymerase and deoxyribonucleotide triphates (dNTPs). In reaction, the nucleotide fragments, such as DNA fragments, serve as target templates. The primers are configured to anneal to the target template and are required for synthesis sequence initiation. The polymerase enzymatically assembles a new strand of nucleotide fragment from the synthesis material, i.e. dNTPs.

Each thermal cycler typically consists of three temperature steps: denaturation, annealing, and extension. Specifically, during denaturation, the thermal cycler heats the reaction samples to a first temperature to denature the nucleotide fragments from double strands to single strands. Annealing involves lowering the reaction sample to a second temperature to anneal the pair of primers to the nucleotide fragment. The polymerase binds to a primer-template hybrid, initiating sequence synthesis. Extension involves heating the reaction sample to a third temperature to enable the polymerase to have optimum activity. At this point, the polymerase synthesizes a new strand of nucleotide fragment complementary to the target sequence within the template, by adding the dNTPs. After a series of repeated cycles, amplification of the template achieves detectable magnitude.

Consequentially, optimization of PCR is time and efficiency-dependent vis-à-vis temperature control.

The conventional thermal cycler heats the reaction samples utilizing electrical resistive, Peltier, or radiation heating. However, such heating mechanisms usually employ heating elements with high specific heat capacity, and time-consuming heating and cooling sequences in achieving specific temperatures. In addition, the conventional thermal cycler consumes a lot of energy to cool down the temperature of the reaction sample. That is, energy is not used efficiently.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present thermal cycler.

DETAILED DESCRIPTION

Figure 1:
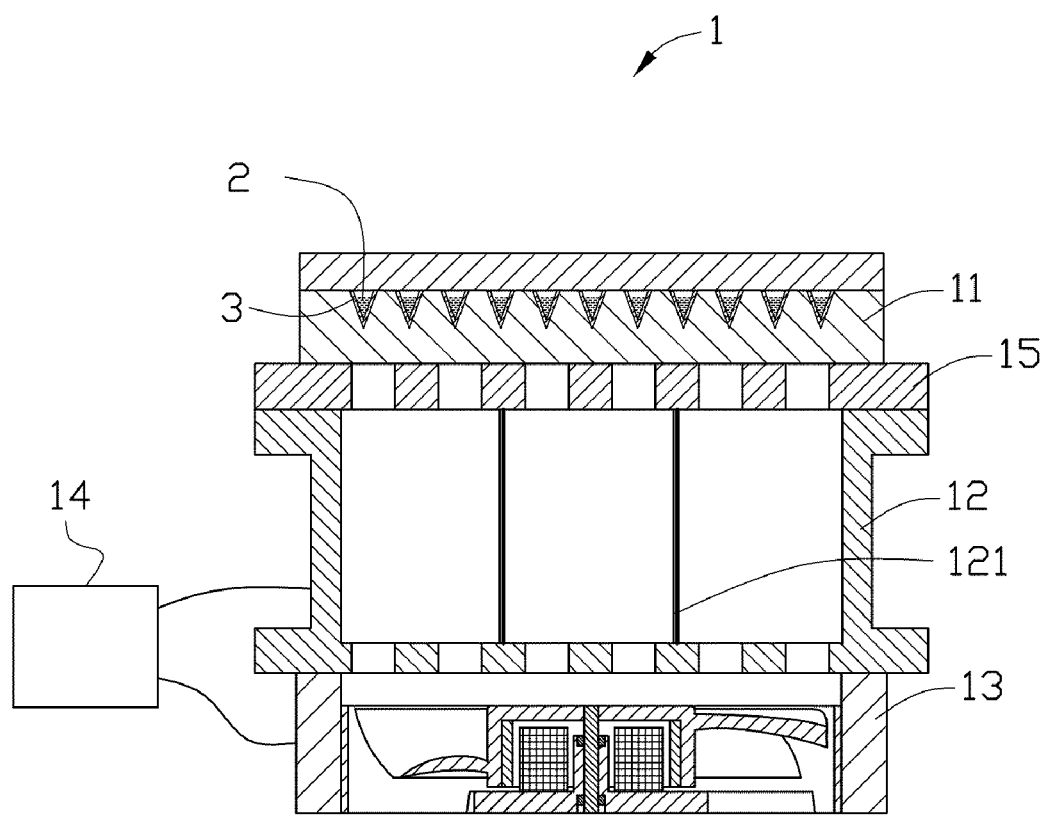
FIG. 1 is a schematic view of a thermal cycler, in accordance with an embodiment.

Referring to FIG. 1, one embodiment of a thermal cycler 1 includes a bearing element 11, a heating element 12, a first cooling element 13 and a temperature controller 14. The bearing element 11 is configured to carry at least one reaction mixture 2. In the present embodiment, the first cooling element 13, the heating element 12, and the bearing element 11 are disposed in succession. The temperature controller 14 is electrically connected to the heating element 12 and the first cooling element 13. However, the position of the first cooling element 13, the heating element 12, and the bearing element 11 is given as an example, to illustrate the thermal cycler 1 of the present embodiment. Any suitable positions for the heating element 12 or the cooling element 13, to be in thermal contact with the reaction mixture 2, can be chosen in the thermal cycler 1.

The bearing element 11 can be a plate structure. A plurality of wells is defined in the bearing element 11 for carrying the reaction mixtures 2. In the present embodiment, each reaction mixture 2 includes one or more nucleotide fragments to be amplified and a reagent including a pair of primers, polymerase, deoxyribonucleotide triphates (dNTPs), and buffer solution. The reaction mixtures 2 can be stored in tubes 3 made of a material with high thermal conductivity. The tubes 3 may be held in the wells and carried by the bearing element 11.

Figure 2:
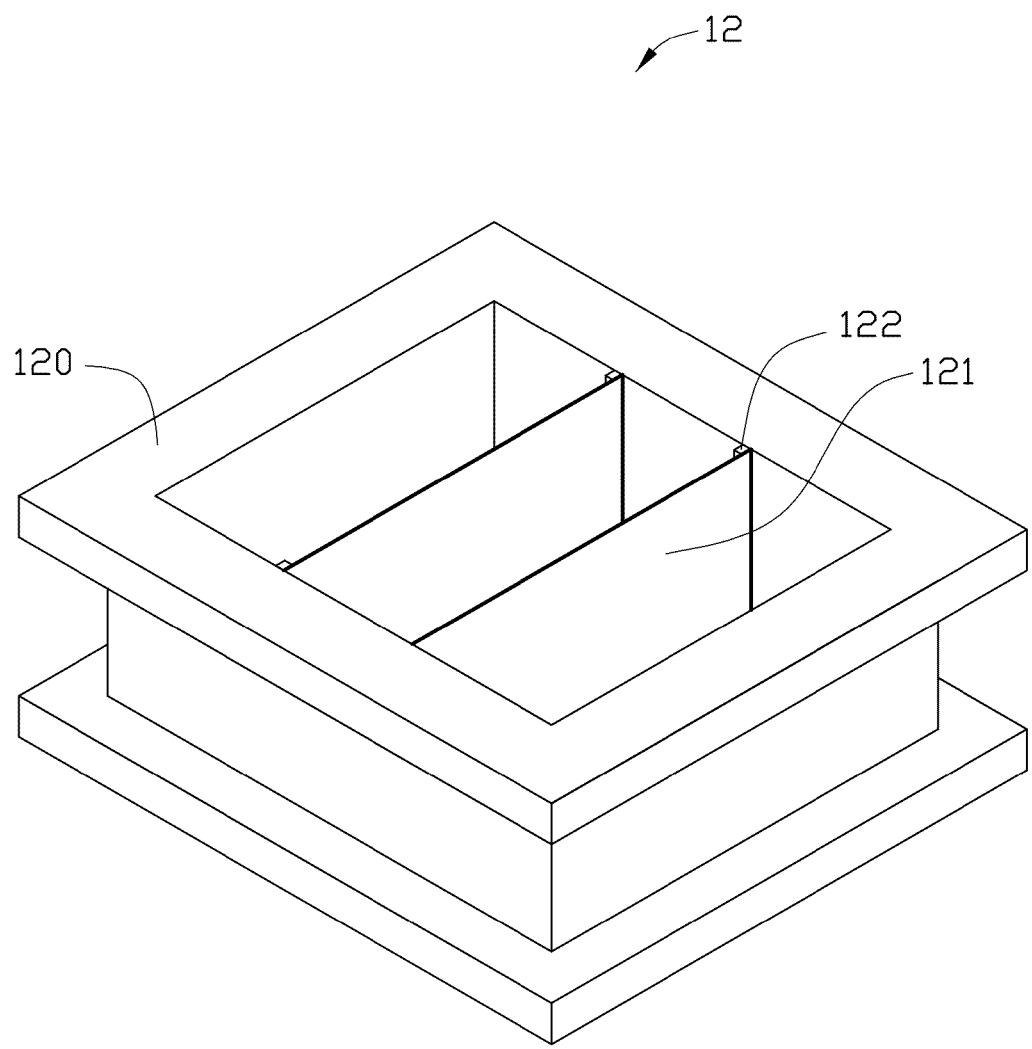
FIG. 2 is a schematic view of a heating element of the thermal cycler of FIG. 1 accommodated in a housing
Figure 3:
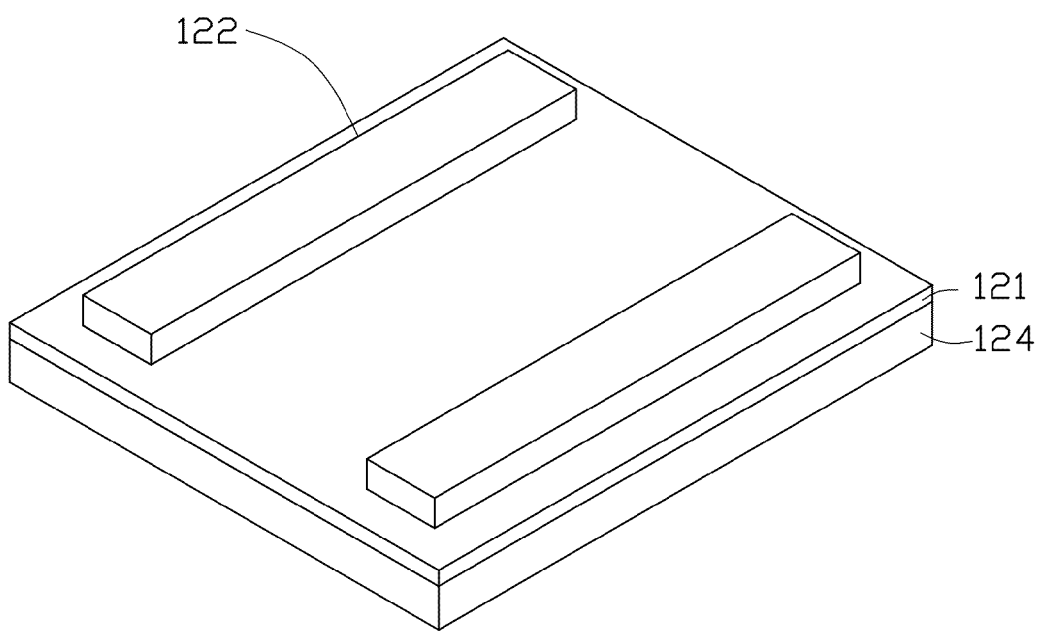
FIG. 3 is a schematic view of a heating unit, in accordance with an embodiment.

The heating element 12 is configured to raise the temperature of the reaction mixtures 2. Referring to FIG. 2 and FIG. 3, in the present embodiment, the heating element 12 includes a housing 120, at least one carbon nanotube structure 121, and a pair of electrodes 122. The pair of electrodes 122 is electrically connected to the carbon nanotube structure 121 that serves as a heating unit in the housing 120. When the electrodes 122 are subjected to an electric force, a current is passed through the carbon nanotube structure 121, causing heat to be generated. Accordingly, a medium surrounding the heating element 121, i.e. air, is heated. The heated air then raises the temperature of the reaction mixture 2. Because the specific heat capacity of the carbon nanotube structure 121 and air are very low, the required heating time to achieve a predetermined temperature is short. In addition, because air convection is an efficient way to transfer heat energy, most of the heat generated by the carbon nanotube structure 121 is used to raise the temperature of the reaction mixture 2.

In the present embodiment, the heating element 12 comprises a plurality of carbon nanotube structures 121, which are disposed in the housing 120 and are substantially parallel to each other, as shown in FIG. 2. In addition, the carbon nanotube structures 121 are disposed with respect to an airflow direction. For example, airflow is generated in a direction from the first cooling element 13 to the bearing element 11. Accordingly, the carbon nanotube structures 121 are spaced from each other and are substantially parallel to the airflow direction, allowing the air to flow through the space between two adjacent carbon nanotube structures 121. In the present embodiment, the number of carbon nanotube structures 121 disposed in the housing 120 is arbitrary and dependent on the heating effect to be achieved in practice.

Figure 4:
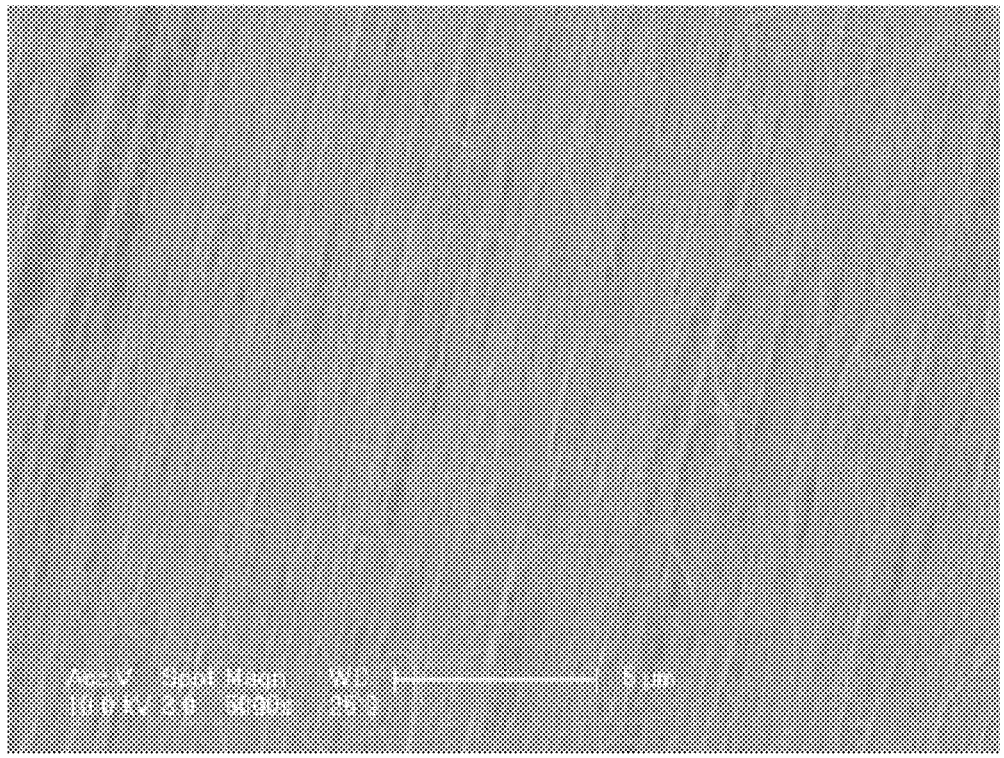
FIG. 4 is a Scanning Electron Microscope image of a carbon nanotube film, in accordance with an embodiment.
Figure 6:
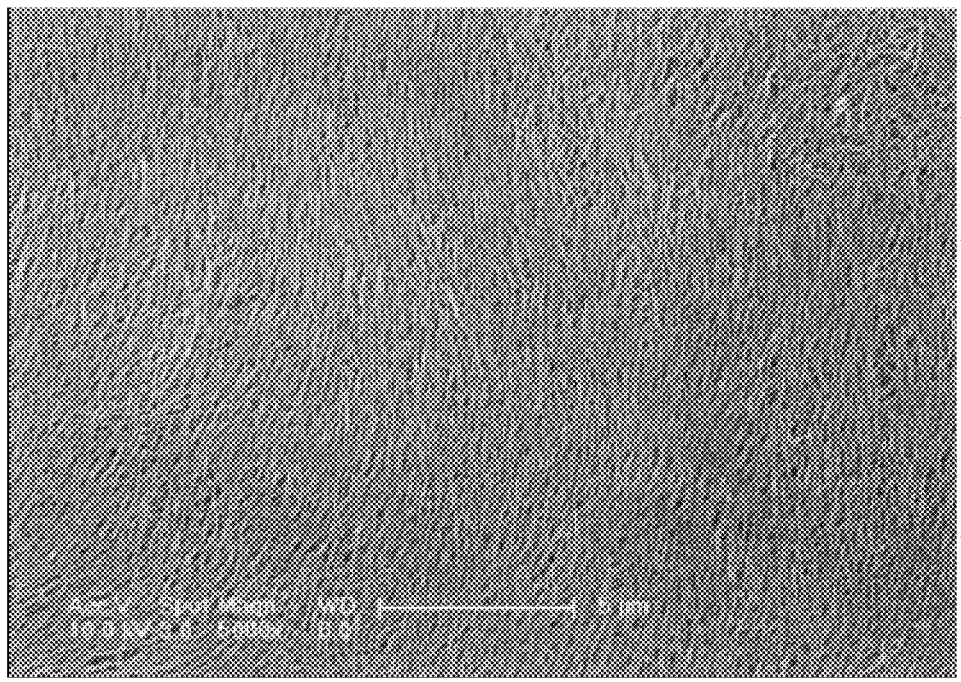
FIG. 6 is a Scanning Electron Microscope image of a carbon nanotube film formed by press treatment.
Figure 7:
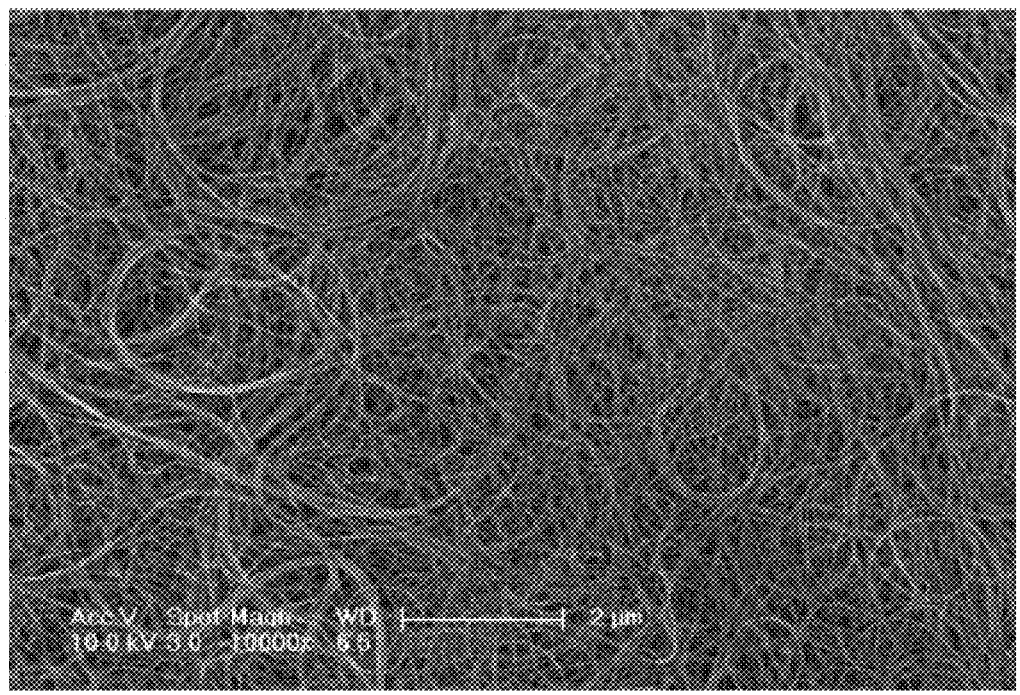
FIG. 7 is a Scanning Electron Microscope image of a carbon nanotube film formed by flocculation.
Figure 8:
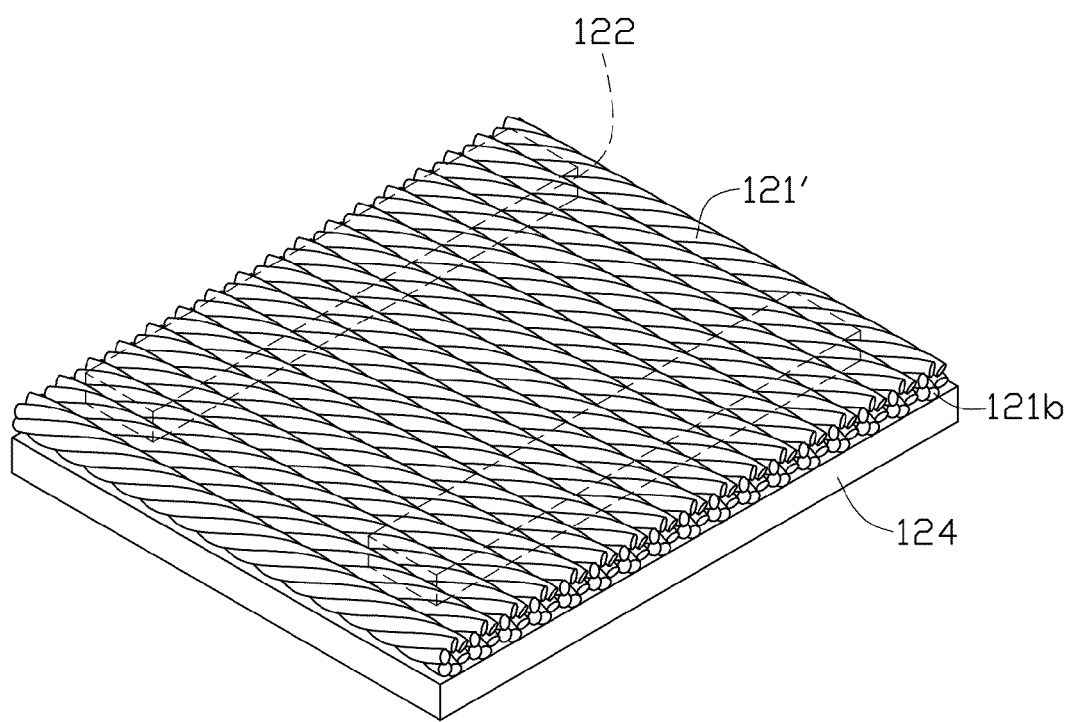
FIG. 8 is a schematic view of a heating unit, in accordance with another embodiment.
Figure 11:
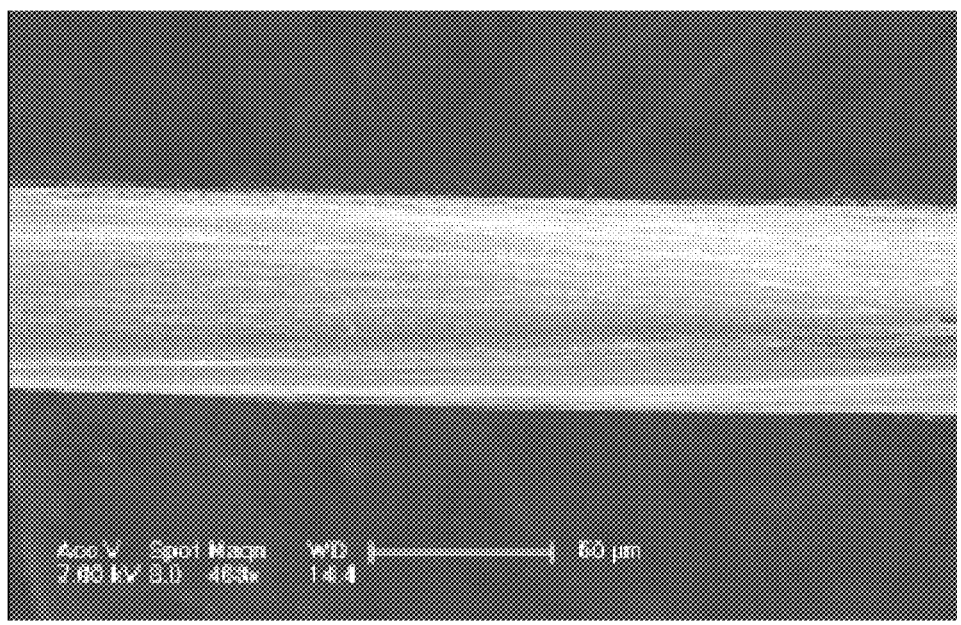
FIG. 11 is a Scanning Electron Microscope image of a carbon nanotube wire of FIG. 9.

The carbon nanotube structures 121 include a plurality of carbon nanotubes distributed uniformly. In the present embodiment, the carbon nanotubes can be aligned to form a carbon nanotube film, as shown in FIG. 4, FIG. 6 and FIG. 7, or a carbon nanotube wire, as shown in FIG. 11. Thus, at least one carbon nanotube film or a plurality of carbon nanotube wires are used to make up the carbon nanotube structures 121 of the present embodiment. The heating element 12 of the present embodiment is workable when the pairs of electrodes 122 are incorporated and electrically connected to the corresponding carbon nanotube structure 121. Accordingly, the electrodes 122 are disposed on the carbon nanotube structures 121 and spaced apart from one another, as shown in FIG. 3. The electrodes 122 can be made of a material such as metal, alloy, indium tin oxide, antimony tin oxide, silver gel, conductive polymer, or conductive carbon nanotube for example. The metal can be palladium (Pd), cesium (Cs), aluminum (Al), copper (Cu), tungsten (W), molybdenum (Mo), gold (Au), titanium (Ti), neodymium (Nd) or alloy thereof.

Figure 5:
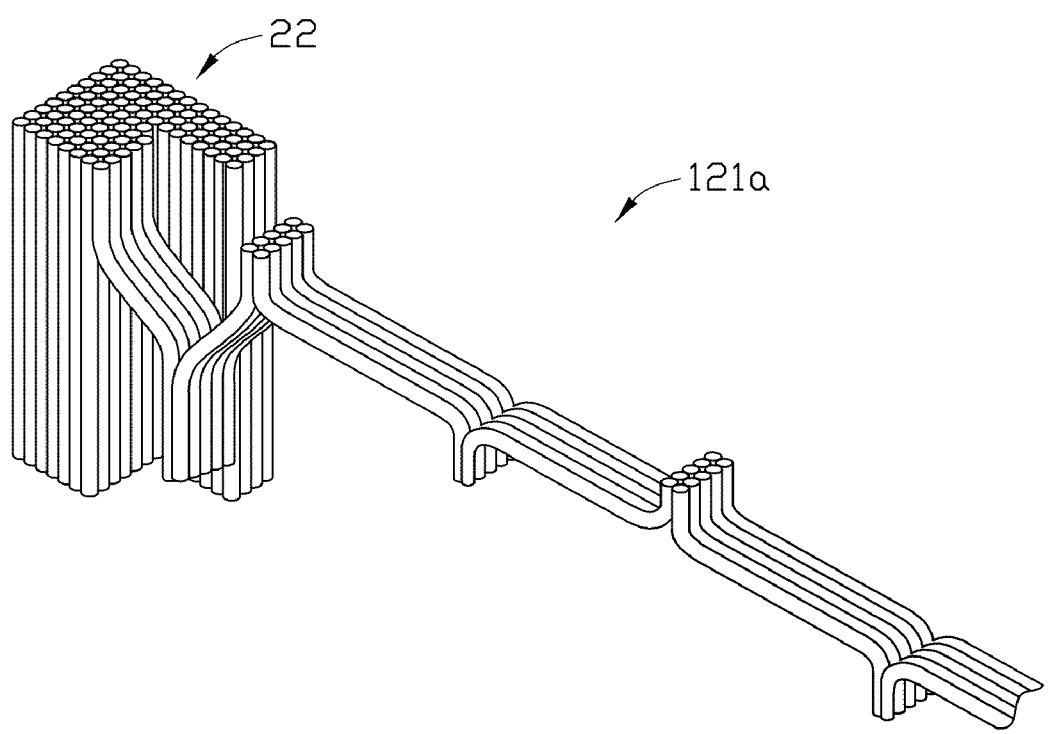
FIG. 5 is a schematic view of manufacturing the carbon nanotube film of FIG. 4.

Referring to FIG. 4 and FIG. 5, as mentioned above, the carbon nanotube film 121a can be formed by drawing carbon nanotubes from a carbon nanotube array 22. In such case, the drawn carbon nanotubes are joined end to end in succession by van der Waals attractive force. In addition, the carbon nanotubes in the carbon nanotube film 121a are orientated primarily in the same direction. In the present embodiment, the carbon nanotube array 22 is grown on 4-inch silicon wafer by vapor deposition. Accordingly, a width of the carbon nanotube film 121a corresponds to a size of the carbon nanotube array 22. In the present embodiment, the drawn carbon nanotube film 121a has a width ranging from about 0.1 mm to about 10 cm and has a thickness ranging from about 10 nm to about 100 μm.

Each carbon nanotube structure 121 can include one or more carbon nanotube films 121a. If the carbon nanotube structures 121 are comprised of one layer of carbon nanotube film 121a, the heating element 12 further includes a base 124 provided to support the carbon nanotube film 121a, as shown in FIG. 3. The base 124 can be made of a hard material, such as ceramic, glass or quartz. Alternatively, the base 124 can be made of a flexible material, such as fiber. In the present embodiment, a ceramic substrate is used to support the carbon nanotube film 121a. In such case, the electrodes 122 are spaced apart from each other on the base 124 and the carbon nanotube film 121a is spread on the base 124 from one electrode 122 to the other electrode 122. Specifically, the carbon nanotubes of the carbon nanotube film 121a are orientated to extend from one electrode 122 to the other electrode 122 along an axial direction. Thus, through such deposition, it is possible to allow maximum current to pass through the carbon nanotubes and heating efficiency of the carbon nanotube structure 121 is improved.

Alternatively, if each of the carbon nanotube structures 121 is comprised of a plurality of carbon nanotube films 121a stacked on top of each other, the carbon nanotube structure 121 can form a free-standing structure. The carbon nanotube films 121a can be stacked in succession to allow axial directions of the adjacent carbon nanotube films 121a to be parallel or intersect in a predetermined manner. If the carbon nanotube films 121a intersect each other, an existing angle between two adjacent carbon nanotube films 121a would be more than about 0 degrees and less than or equal to about 90 degrees. In the present embodiment, each carbon nanotube structure 121 is comprised of ten layers of carbon nanotube films 121a intersected perpendicularly. It is noteworthy, that the number of carbon nanotubes films 121a and the angle made by adjacent carbon nanotube films 121a are arbitrary and set according to practical requirements.

Referring to FIG. 6, the carbon nanotube film 121a can also be formed by pressing the carbon nanotube array 22. In such case, when the carbon nanotube array 22 is pressed along a variety of directions, the carbon nanotubes of the carbon nanotube film 121a are oriented in different directions. Alternatively, when the carbon nanotube array 22 is towards one direction, the carbon nanotubes of the carbon nanotube films 121a are mainly oriented in that primary direction. Overall, an angle of the carbon nanotube and a surface of the carbon nanotube film 121a ranges from about 0 degrees to about 15 degrees. In addition, a thickness of the carbon nanotube film 121a is closely related to the height of the carbon nanotube array 22, and the pressure applied to the carbon nanotube array 22. In the present embodiment, a thickness of the carbon nanotube film 121a ranges from about 1 μm to about 1 mm.

Alternatively, referring to FIG. 7, the carbon nanotube film 121a can be obtained by flocculating the carbon nanotube array 22. In this case, the carbon nanotubes in the carbon nanotube film 121a are entangled by van der Waals attractive force therebetween, thereby allowing the carbon nanotube film 121a to form a microporous structure. That is, the carbon nanotube film 121a is microporous and has a plurality of micropores with diameters of less than 50 μm. In addition, a thickness of the flocculated carbon nanotube film 121a ranges from about 1 μm to about 2 mm.

Heat response of the carbon nanotube film 121a is inversely proportional to the thickness thereof. That is, the thicker the carbon nanotube film 121a, the slower the heat response. In the present embodiment, the thickness of the carbon nanotube film 121a is designed to range from about 100 nm to about 5 mm. In order to achieve a preferable heating effect, the carbon nanotube structure 121 can be formed to have a thickness of about 0.2 μm.

In the present embodiment, some of the carbon nanotubes in the carbon nanotube film 121a treated with pressure or flocculation are overlapped or entangled with each other by van der Waals attractive force. Thus, the carbon nanotube structure 121 of the present embodiment is elastic and flexible.

Figure 9:
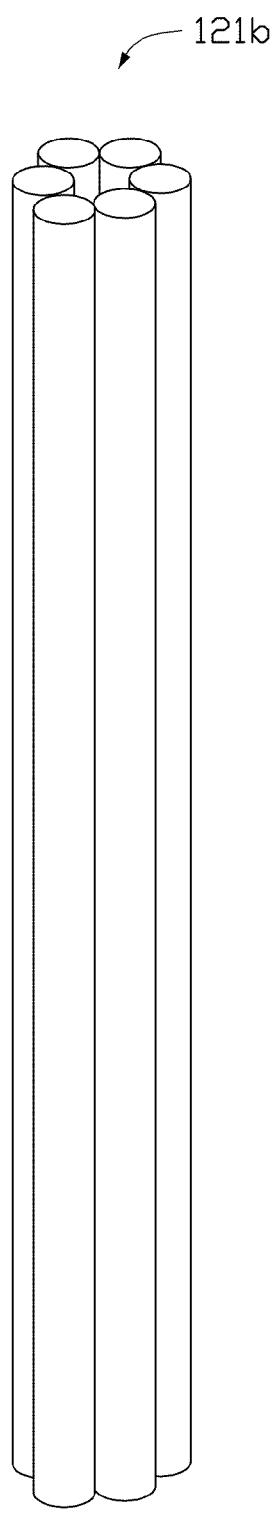
FIG. 9 and FIG. 10 are schematic views of carbon nanotube wires of FIG. 8.
Figure 10:
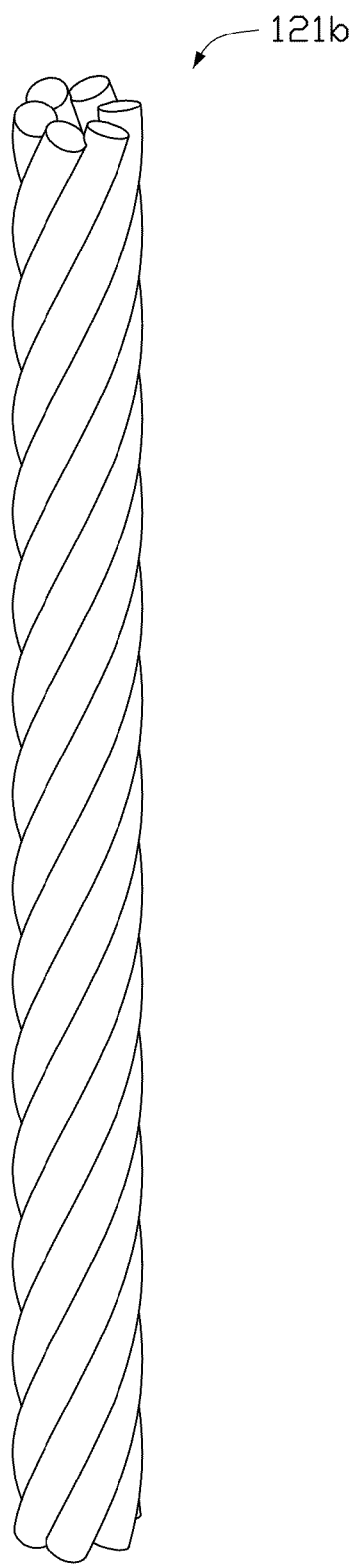

Alternatively, referring to FIG. 8 to FIG. 11, a carbon nanotube structure 121' in accordance with another embodiment can comprise a plurality of carbon nanotube wires 121b. Each of the carbon nanotube wires 121b may be formed by bundling a plurality of carbon nanotubes together, as shown in FIG. 9. Accordingly, the carbon nanotubes are substantially parallel to an axis of the carbon nanotube wire 121b, forming a bundled carbon nanotube wire. In practice, the bundled carbon nanotube wire is obtained by treating the drawn carbon nanotube film 121a with an organic solvent. In addition, each of the carbon nanotube wires 121b can be formed by bundling and twisting a plurality of carbon nanotubes together. Referring to FIG. 10, the carbon nanotubes are aligned helically around an axis of the carbon nanotube wire 121b, forming a twisted carbon nanotube wire. In practice, the twisted carbon nanotube wire is obtained by either twisting the bundled carbon nanotube wire 121b or twisting the carbon nanotube film 121a via a mechanical force. As mentioned previously, the bundled or twisted carbon nanotube wire 121*b* has a diameter ranging from about 20 µm to about 2 mm. In the present embodiment, the carbon nanotube structure 121 is comprised of a plurality of twisted carbon nanotube wires 121*b*, each of which has a diameter of about 50 µm.

In the present embodiment, the carbon nanotube wires 121*b* of the carbon nanotube structure 121' are substantially parallel to each other. The adjacent carbon nanotube wires 121*b* lie apart from each other by a distance of less than about 30 µm. In this embodiment, the carbon nanotube wires 121*b* are equidistantly spaced approximately 20 µm. Alternatively, the carbon nanotube structure 121' can be formed by weaving the carbon nanotube wires 121*b* with each other. As mentioned above, the carbon nanotube wires 121*b* are arranged from one electrode 122 to the other electrode 122 and allow each axis of the carbon nanotube wire to extend from one electrode 122 to the other electrode 122.

In addition, the heating element 12 can further include a reflective layer (not shown in FIG.) disposed surrounding the inside of the housing 120. The reflective layer is configured to reflect the heat generated from the carbon nanotube structures 121. Thus, the heat energy can be collectively gathered and prevented from escaping outside, thereby improving heating efficiency. The reflective layer is made of thermal insulation material such as metal oxide, metal salt and ceramic. For example, the reflective layer, made of aluminum oxide ($Al_2O_3$), is deposited on the inside of the housing 120 via sputtering.

The first cooling element 13 is an air-cooled condenser. In the present embodiment, the first cooling element 13 includes a fan. In use, to lower temperature of the reaction mixtures 2 with the thermal cycler 1, the first cooling element 13 is activated while the heating element 12 is shut down. The first cooling element 13 forces the air into the thermal cycler 1 lowering the temperature of the reaction mixture 2 to a specific target. Accordingly, the thermal cycler 1 can further include a first air-conducting element 15, which is disposed between the bearing element 11 and the heating element 12. The first air-conducting element 15 is configured to conduct the air to flow to the reaction mixtures 2, thereby improving cooling efficiency. This does not threaten the structure of the carbon nanotube films 121*a* or wires 121*b* because of the parallel positioning of the carbon nanotube structure 121 to the direction of airflow.

Figure 12:
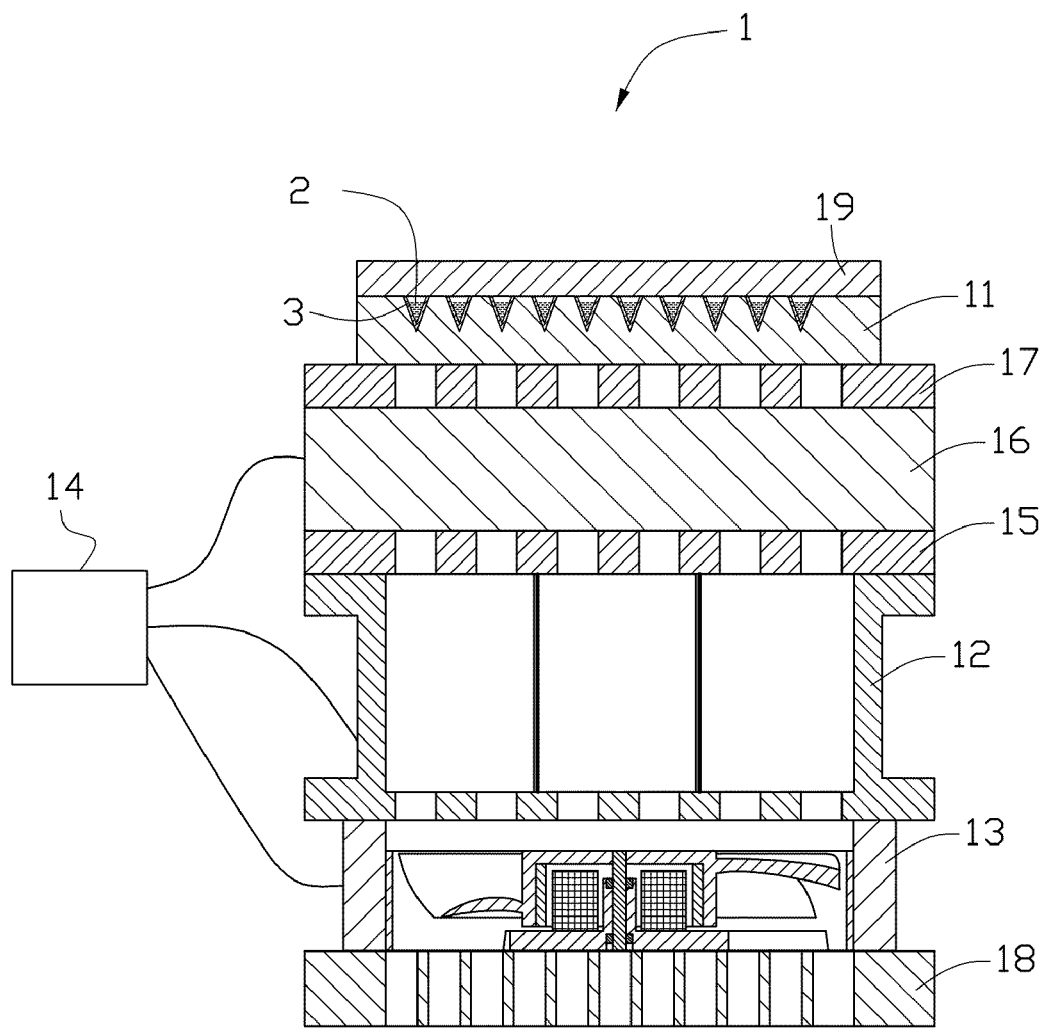
FIG. 12 is a schematic view of a thermal cycler, in accordance with another embodiment.

Referring to FIG. 12, a thermal cycler 1 in accordance with another embodiment, can include a second air-cooling element 16 disposed between the heating element 12 and the bearing element 11. In particular, when the first air-conducting element 15 is deployed, the second air-cooling element 16 can be disposed between the first air-conducting element 15 and the bearing element 11. In the present embodiment, the second air-cooling element 16 may be a semiconductor cooling device or a compressor. The second air-cooling element 16 is used when the first air-cooling element 13 is incapable of lowering the reaction mixture 2 to a predetermined temperature. In addition, the thermal cycler 1 can include a second air-conducting element 17 to conduct the air to obtain stable and uniform airflow distribution.

Additionally, the thermal cycler 1 can further include a filter 18 disposed at one side of the first cooling element 13. The filter 18 is disposed adjacent to an air inlet of the first cooling element 13 to prevent the surrounding duct from entering the thermal cycler 1'. In addition, the thermal cycler 1 can further include a lid 19 disposed above the bearing element 11 to cover the reaction mixture 2 when the thermal cycler 1 is operated. Thus, the duct, germs or other foreign interfering particles threatening the reaction process, can be prevented from decreasing the success rate of reaction.

The temperature controller 14 is coupled to the heating element 12, the first cooling element 13 or the second cooling element 16. The temperature controller 14 is programmed to vary the temperature of the cooling elements 13, 16 and the heating element 12. Thus, the temperature of the reaction may be regulated based on predetermined procedures.

In conclusion, the thermal cycler employs the carbon nanotube structure as the heating element. Due to the low specific heat capacity of the carbon nanotube structure at less than $1.7 \times 10^{-6}$ $J/m^2 \cdot K$, the heating element can allow the reaction mixtures to rapidly achieve a predetermined temperature. In addition, the thermal cycler can quickly lower the reaction mixture's temperature because of the low specific heat capacity of the carbon nanotube structure. Therefore, changing temperature and thermal energy conversion is efficient.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A thermal cycler for at least one reaction mixture, comprising:
   a bearing element carrying the at least one reaction mixture;
   a heating element raising a temperature of the at least one reaction mixture, the heating element comprising a housing, at least one carbon nanotube structure and a pair of electrodes, the at least one carbon nanotube structure and the pair of electrodes being accommodated in the housing, the pair of electrodes being electrically connected to the at least one carbon nanotube structure, wherein the housing defines a space and at least part of the at least one carbon nanotube structure is suspended in the space;
   a first cooling element cooling the temperature of the at least one reaction mixture; and
   a temperature controller electrically connected to the heating element and the first cooling element, the temperature controller controlling the operation of the heating element and the first cooling element,
   wherein airflow is generated in a flow direction from the first cooling element to the bearing element, and the at least one carbon nanotube structure is substantially parallel to the flow direction such that heat is transferred to the bearing element according to the airflow.

2. The thermal cycler of claim 1, wherein the first cooling element, the heating element, and the bearing element are disposed in succession.

3. The thermal cycler of claim 2, further comprising a first air-conducting element disposed between the bearing element and the heating element.

4. The thermal cycler of claim 2, further comprising a filter disposed at one side of the first cooling element.

5. The thermal cycler of claim 2, further comprising a second cooling element disposed between the heating element and the bearing element.

6. The thermal cycler of claim 5, further comprising a air-conducting element disposed between the second cooling element and the bearing element.

7. The thermal cycler of claim 1, wherein the heating element comprises a plurality of carbon nanotube structures substantially parallel to each other.

8. The thermal cycler of claim 1, wherein one of the at least one carbon nanotube structures comprises at least one carbon nanotube film or a plurality of carbon nanotube wires.

9. The thermal cycler of claim 8, wherein the carbon nanotube structure comprises a plurality of carbon nanotube films stacked in succession.

10. The thermal cycler of claim 8, wherein the at least one carbon nanotube film comprises a plurality of carbon nanotubes joined end to end substantially along a primary direction.

11. The thermal cycler of claim 8, wherein the at least one carbon nanotube film comprises a plurality of carbon nanotubes, an angle of the plurality of carbon nanotubes and one surface of the at least one carbon nanotube film ranges from about 0 degrees to about 15 degrees.

12. The thermal cycler of claim 8, wherein the at least one carbon nanotube film comprises a plurality of carbon nanotubes entangled with each other.

13. The thermal cycler of claim 8, wherein the plurality of carbon nanotube wires are weaved to each other.

14. The thermal cycler of claim 8, wherein the plurality of carbon nanotube wires are substantially parallel to each other.

15. The thermal cycler of claim 8, wherein one of the plurality of carbon nanotube wires comprises a plurality of carbon nanotubes, which are bundled together and are substantially parallel to an axis of the carbon nanotube wire.

16. The thermal cycler of claim 8, wherein one of the plurality of carbon nanotube wires comprises a plurality of carbon nanotubes, which are bundled by twisting together and are aligned helically around an axis of the carbon nanotube wire.

17. The thermal cycler of claim 1, wherein a thickness of the at least one carbon nanotube structure ranges from about 100 nm to about 5 mm.

18. The thermal cycler of claim 1, wherein the heating element further comprises a base, the at least one carbon nanotube structure being disposed on the base.

* * * * *